United States Patent [19]

Blanquart

[11] 4,448,630
[45] May 15, 1984

[54] MACHINE FOR APPLYING A FILM

[76] Inventor: Philippe Blanquart, 43 rue du Marais, 59152 Tressin (Nord), France

[21] Appl. No.: 397,805

[22] Filed: Jul. 13, 1982

[51] Int. Cl.³ .............................................. B32B 31/00
[52] U.S. Cl. ..................................... 156/514; 156/108; 156/252; 156/324; 156/555
[58] Field of Search ............... 156/108, 250, 252, 514, 156/555, 324; 493/222; 206/45.31, 45.34; 229/3.1

[56] References Cited

U.S. PATENT DOCUMENTS

| 2,977,271 | 3/1961 | Lutwack | 156/108 |
| 3,459,625 | 8/1969 | Heller et al. | 156/514 X |
| 3,490,678 | 1/1970 | James et al. | 206/45.31 X |
| 3,565,730 | 2/1971 | Weisshuhn | 156/514 |

Primary Examiner—David A. Simmons
Attorney, Agent, or Firm—Robert E. Burns; Emmanuel J. Lobato; Bruce L. Adams

[57] ABSTRACT

The invention relates to a machine for applying film.

The machine comprises a winding arrangement on which the roll of film is stored, a station for glueing the film, a tunnel oven followed by an applicator unit composed of a pressure roller and a counter-pressure roller between which passes the glued film and the cardboard supports comprising cut-outs in order to press the film onto the front side of the cardboard supports.

According to the invention, the arrangement of the cardboard supports covered with film is deflected at the outlet of the applicator unit, in order to separate the arrangement from the counter-pressure roller.

The invention will be used in particular for applying film to cardboard supports comprising cut-outs, serving to form packaging boxes provided with a transparent window.

8 Claims, 3 Drawing Figures

MACHINE FOR APPLYING A FILM

The invention relates to a machine for applying a film. It is used in particular for applying a film of polypropylene or acetate to a cardboard support comprising cut-outs. The arrangement constituted by the cardboard support coated with a film will in particular make it possible to produce packing boxes comprising at least one transparent window through which it is possible to see the product located inside the box.

At present, there are a large number of machines for applying film which make it possible to apply a film of polypropylene or acetate to the front side of a cardboard support which is generally printed previously in order to give the arrangement a shiny appearance. In the case where the film applied is polypropylene or another synthetic material, the final product obtained moreover has the advantage of being waterproof and moreover is much stronger.

This type of machine generally comprises a winding arrangement on which is stored the roll of film whereof the width is identical to that of the cardboard surface to be coated. The machine comprises a glueing station which makes it possible to coat one face of the film with a uniform layer of glue then, the glued film is applied to the cardboard support by the intermediary of two rollers between which the film stuck to the front side of the cardboard support is compressed. The band produced in this way is cut up and the cut cardboard supports may be made into boxes depending on the use for which they are intended.

This type of machine does not involve great difficulties as regards production and is satisfactory in its use.

On the other hand, in the case of cardboard supports comprising cut-outs, machines of the preceding type cannot be used directly. In fact, in the vicinity of the cut-outs, the glued film is no longer applied to a support and consequently represents an adhesive surface to which all the impurities present in the manufacturing workshop may stick. Thus, the resulting product does not fulfil its function absolutely, since the window no longer has perfect transparency and the final product loses its attractive appearance.

Consequently, at the present time, the production of transparent windows in packing boxes is obtained by coating the periphery of the cut-out in the cardboard support with a glue which is compatible with the materials to be assembled, this coating being applied to the rear side of the cardboard support. Then, a film cut to the dimensions suitable for the window which it is intended to cover is applied to the glued rear side of the cardboard support.

In this case, it is the support which is coated with glue and the film is simply applied to the rear side of the cardboard support. It is not possible to apply glue to the film as has been explained previously, in view of the fact that the glued part of the film which is not applied to the support, is in contact with the open air and rapidly becomes opaque. Moreover, it would be extremely difficult to glue solely the periphery of the film, which is contact with the cardboard support.

It would also be very unattractive to glue the film to the front side of the cardboard sheet, since in this case the bead of glue would be visible and this would then cause a superficial deformation of the resulting product.

In conclusion, present packaging comprising windows is expensive, since it is ill-suited to automatic manufacture and moreover requires large quantities of glue in view of the fact that the cardboard support coated with glue absorbs a large part of the liquid glue.

Furthermore, if one wishes to obtain packaging benefitting from the properties provided by the outer coating of film, it is necessary to carry out a double operation, namely the application of the outer film, then, cutting out of the window and finally the provision of an inner window of film.

This type of packaging is thus not widely used at present, despite its very attractive economic role from the client's point of view.

The main object of the present invention is to provide a machine for applying film, which is capable of applying a film of polypropylene or acetate to a cardboard support comprising cut-outs. The film is applied to the front side of the cardboard support, which will make the support water-proof and stronger. Thus, the application is direct and it is no longer necessary to proceed with processing of the cardboard supports on another machine in order to provide a transparent window in the cardboard support comprising cut-outs.

Moreover, the machine for applying film will leave no trace on the cardboard support coated with film, in order that the final product obtained is homogeneous and has a pleasant appearance.

The machine for glueing will be particularly suitable for carrying out a particular glueing method in which the glue has very rapid drying properties after it is applied to the cardboard support, so that the various impurities present in the manufacturing workshop are not able to stick to the film in the region of the transparent window and thus make the later opaque.

The machine for applying the film will have a geometry of construction such that the glued surface of the film in the vicinity of the window, never comes into contact with any part of the machine or outer member before it is dry. In fact, it has been noted that the least contact of the surface of the glued film when the glue is not completely dry, with any surface such as the periphery of a return roller or the like leaves an imprint on the film which impairs its transparency.

Thus, at the present time, when one attempts to apply a film to a cardboard support comprising cut-outs with traditional machines for applying films, one cannot fail to obtain a final product which comprises traces in the vicinity of the transparent window which are produced by the passage of the film between the pressure and counter-pressure rollers which apply the film to the cardboard support.

Now the machine according to the present invention makes it possible to obviate these drawbacks in order to obtain a finished product of high quality.

The machine for applying film intended in particular for applying a film of polypropylene or acetate to a cardboard support comprising cut-outs, comprises a winding arrangement in which the roll of film is stored, a station for glueing the surface of the film, a tunnel oven in which the glued film is heated, an applicator group composed of a pressure cylinder and a counter-pressure cylinder pressed tangentially one against the other between which passes the glued film superimposed on the front side of the cardboard support, is characterised by the fact that means deflect the arrangement of the cardboard support coated with film, leaving the applicator group, in order to separate it from the counter-pressure roller.

The invention will be better understood on referring to the following description and to the accompanying drawings which form an integral part thereof.

Figure 1:
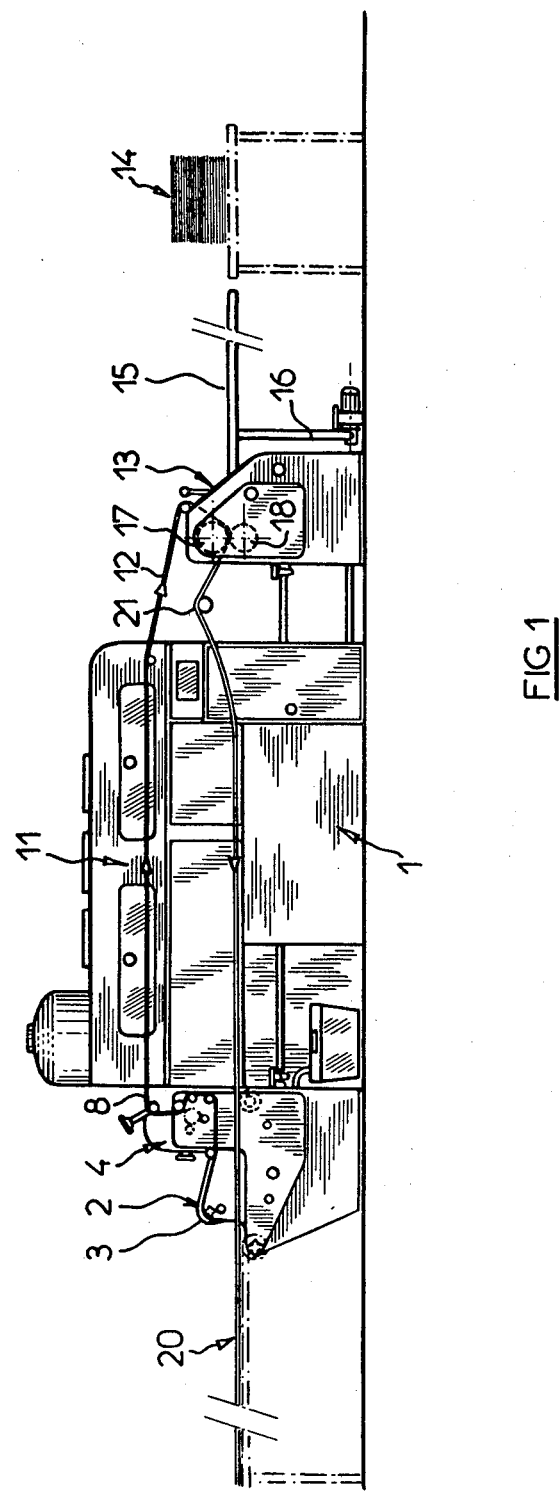
FIG. 1 is a general view of the machine for applying a film, constructed according to a preferred embodiment.

The machine for applying film of the invention is illustrated in FIG. 1 in a preferred embodiment.

The latter is a machine having a longitudinal arrangement necessary for successively carrying out the various operations necessary for processing the film.

In fact, according to the present invention, the machine for applying film has the feature of applying film to the front side of cardboard supports whilst being adapted to the fact that the latter comprise cut-outs.

The advantages of applying film to the outer face of the cardboard support are thus retained, namely greater solidity, a shiny appearance and possibly water-proofing of the product, when one uses a polypropylene film for example. However, the machine is equipped in order to apply a film of any nature, in particular an acetate or polypropylene film. Now, in view of the desired final characteristics, it is obvious that the film will advantageously be transparent.

In order to reduce the length of the machine, the latter will have an arrangement for treating the film on two levels.

According to the embodiment of the machine for applying film illustrated in FIG. 1, the latter integrates the various working stations necessary for the application of the film to the cardboard support. At one end the frame 1 of the machine comprises a winding arrangement 2 in which the roll of film 3 is stored. In general, the width of the film will be identical to the width of the cardboard support to be covered with film. It is possible to place several rolls side by side in order to apply a film to cardboard supports arranged in parallel.

The film coming from the winding arrangement 2 is introduced into a glueing station 4. In fact, it has been chosen to glue the film rather than the cardboard support in order to save on the consumption of glue, in fact, due to their porous composition, cardboard supports absorb a large part of the glue applied to their surfaces and consequently, it is necessary to use large quantities thereof in order to obtain satisfactory results.

Consequently, the glueing station 4 makes it possible to coat the surface of the film with a film of glue of constant thickness over its entire surface.

Figure 2:
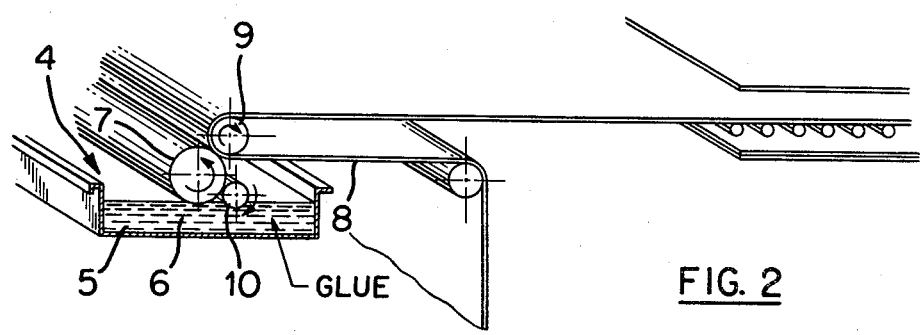
FIG. 2 shows the operation of the glueing station, in detail.

FIG. 2 shows a preferred embodiment of the glueing station 4. The latter firstly comprises a longitudinal vat 5 filled with glue 6. This glue 6 has properties of adhesion which make it suitable for the surfaces to be stuck.

The vat of glue 5 will advantageously be of small capacity in order that the glue 6 contained in this vat does not dry. The vat 5 will advantageously work with a constant level, that is to say that a device for supplying glue will fill the vat 5 as it is needed, in order to keep the volume of glue present in the vat 5 constant.

A glueing roller 7 arranged transversely in the vat 5, with respect to the direction of travel of the band 8 of film, is immersed by its lower part in the bath of glue 6 present in the vat 5.

A roller 9 around which the band of film 8 winds is arranged tangentially with respect to the glueing roller 9 so that the surface of the band 8 which is in contact with the glueing roller 7 is coated with glue.

In order to deposit a film of glue of substantially constant thickness over the entire surface of the band of film 8, the glueing station 4 will be provided with an equalizing roller 10. This equalizing roller will be arranged tangentially with respect to the glueing roller 7 and it is possible to adjust the spacing between the two rollers 7 and 10 in order to obtain a thickness of the film of glue present on the periphery of the glueing roller 7 which is adapted to requirements. This film of glue deposited on the periphery of the glueing roller 7 will then be deposited by capillarity on the band of film 8, at the time of its tangential contact with the glueing roller 7.

The glue used will advantageously be of a type containing heat-sealing products and a hardener, furthermore it will have good transparency when dry.

The glued band of film 8 leaving the glueing station 4 will then be introduced into a tunnel oven 11 located in the upper stage of the machine 1. This tunnel oven is of the conventional type and in its lower part comprises a series of driven rollers on which the glued band of film rests, which is thus carried along. The upper part of the tunnel oven 11 is composed of an electrical heating resistance which thus raises the temperature of the film and above all of the coating of glue present on the upper surface.

On leaving the tunnel oven 11, the glued band of film 12 passes into the applicator unit 13. Located upstream of this applicator unit 13 is the store of cardboard supports 14, which makes it possible to forward them one after the other, thus depositing them in succession on a conveyor belt 15.

Thus, the applicator group 13 is supplied on the one hand with glued film 12 and a cardboard support which, according to the present invention, comprises internal cut-outs.

A conventional suction device 16 will be located in the lower part of the conveyor belt 15 in order to press the cardboard supports against the conveyor belt thus to prevent any relative sliding of one cardboard support with respect to the other. In fact it is preferable to arrange the cardboard supports edge to edge, since the band of film is applied continuously and thus there is no wastage of film.

Figure 3:
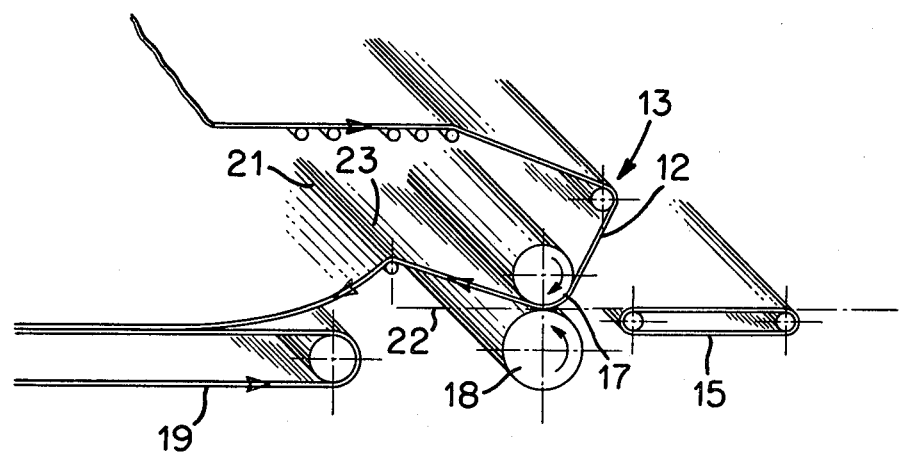
FIG. 3 shows the operation of the applicator group provided with deflection means according to the invention, in detail.

The applicator group 13 is illustrated in detail in FIG. 3. It is composed in particular of a pressure roller 17 arranged transversely with respect to the direction of travel of the cardboard supports 14, for acting on the band of film 12. A counter-pressure roller 18 is arranged tangentially with respect to the pressure roller 17. The glued band of film 12 as well as the cardboard supports 14 are introduced between the pressure roller 17 and counter-pressure roller 18 in order to apply the glued film 12 to the front side of the cardboard supports 14.

A hydraulic jack will press the counter-pressure roller 18 tightly against the pressure roller 17 in order to press the film onto the cardboard support. On the other hand, when the machine is not in use, the jack will be actuated in order to separate the rollers 17 and 18.

The roller 17 will be a rigid roller which will advantageously be chromium-plated on its surface and will be heated. The counter-pressure roller 18 will have a slightly flexible periphery, for example of the rubber type, in order to be able to allow possible slight differences in the thicknesses of the cardboard supports.

However and in contrast to conventional machines for applying film, the flexibility of the rubberized surface of the counter-pressure roller 18 must be very slightly compressible owing to the fact that it is essential that in the vicinity of the cut-outs in the cardboard, the peripheral surface of the counter-pressure roller 18 does not come into contact with the glued film, all the more since it is the glued surface which would immediately have the imprints due to contact.

The sticking of the film to the cardboard support is virtually immediate and moreover, the hardener present in the glue polymerizes the latter in order that it loses its properties of adhesion which would promote the sticking of the impurities present in the atmosphere of the manufacturing workshop.

On leaving the applicator group 13, the cardboard support provided with a film is carried along by a conveyor belt 19 arranged longitudinally in the machine 1 at the lower level.

The product covered with film may thus be recovered at the outlet 20 of the machine which may for example be equipped with a cutting device in order to separate the various cardboard supports coated with film which are connected to each other by the glued band of film.

However, it has been noted that if one is content to carry out the operations described previously, the finished prodoct is not satisfactory owing to the fact that the windows provided in the cardboard supports coated with film comprise traces. Now it has been noted that by deflecting the band 21 of cardboard supports coated with film, at the outlet of the applicator group 13, in order to separate the latter from the counter-pressure roller 18, good results were obtained as regards the finished product.

The reasons for the phenomenon cannot be clearly explained, but it has been noted that by using various means for deflecting the arrangement of cardboard supports coated with film, at the outlet of the applicator group, in order to separate this arrangement from the counter-pressure roller 18, good results were obtained.

FIGS. 1 and 3 show the relatively simple means which have been used in order to obtain this deflection. However it is quite clear that these means are not unique and that many equivalent means could be envisaged without diverging from the scope of the present invention.

The means used cause partial winding of the arrangement of cardboard supports covered with film around the pressure roller 17, after the point of contact between this pressure roller and the counter-pressure roller 18.

The means envisaged in FIGS. 1 and 3 are in the form of a return roller 21 arranged outside the plane 22 tangential to the two rollers 17 and 18, adjacent the pressure roller 17. The arrangement of the cardboard supports coated with film 23 winds partially around the return roller 21, then, due to gravity, returns to lie on the conveyor belt 19 in order to be discharged towards the outlet 20 of the machine 1.

Good results have been recorded by applying glue to the film at the rate of 20 to 24 g/m², this glue being of the type comprising heat sealing components and having an incorporated hardener. This is for a film of polypropylene having a thickness of 12 to 20 microns or a film of acetate having a thickness of 14 to 17 microns.

In the case of a width of cardboard support of approximately 0.5 meters, the force applied by the hydraulic jack to the counter-pressure roller 18 in order to press it against the pressure roller 17, is comprised between 1.5 and 2 tons.

As is apparent from the preceding description, the means described for deflecting the strip of the cardboard supports covered with film leaving the applicator group, may be in various equivalent forms, which cannot be described within the framework of this description, however, it is quite clear that the invention relates to all the means known and within the scope of a man skilled in the art, which would be able to bring about this deflection.

What is claimed is:

1. Machine for applying film intended in particular for applying a film of polypropylene or acetate to a cardboard support comprising cut-outs, comprises a winding arrangement in which is stored the roll of film, a station for glueing the surface of the film, a tunnel oven in which the glued film is heated, an applicator unit composed of a pressure roller and a counter-pressure roller pressed one against the other, between which passes the glued film superimposed on the front side of the cardboard supports, characterised by the fact that means deflect the arrangment of the cardboard support coated with film leaving the applicator unit in order to separate it from the counter-pressure roller.

2. Machine for applying film according to claim 1, characterised by the fact that the means ensure partial winding of the arrangement of the cardboard support covered with film around the pressure roller after the point of contact between the pressure roller and counter-pressure roller.

3. Machine for applying film according to claim 2, characterised by the fact that the means are in the form of a return roller arranged outside the plane tangential to the two rollers adjacent the pressure roller, around which passes the arrangement of the support covered with film.

4. Machine for applying film according to claim 1, characterised by the fact that the pressure roller is chromium-plated and is heated.

5. Machine for applying film according to claim 1, characterised by the fact that the counter-pressure roller has a flexible surface on its periphery, however it is very slightly compressible.

6. Machine for applying film according to claim 1, characterised by the fact that the counter-pressure roller is pressed on the pressure roller according to a force comprised between 1.5 and 2 tons for a width of the cardboard support of approximately 0.5 meters.

7. Machine for applying film according to claim 1, characterised by the fact that the glue comprises heat-sealing components and an incorporated hardener.

8. Machine for applying film according to claim 7, characterised by the fact that the glue is applied to the film at the rate of 20 to 24 g/m².

* * * * *